United States Patent [19]

Heckel et al.

[11] Patent Number: 4,670,075

[45] Date of Patent: Jun. 2, 1987

[54] METHOD OF MANUFACTURING LIGHT-COLORED ELECTRICALLY-CONDUCTIVE FLOOR COVERING

[75] Inventors: Klaus Heckel, Weinheim; Gerhard Graab, Mannheim; Hans-Michael Kuhl, Hemsbach, all of Fed. Rep. of Germany

[73] Assignee: Firma Carl Freudenberg, Weinheim, Fed. Rep. of Germany

[21] Appl. No.: 668,180

[22] Filed: Nov. 5, 1984

Related U.S. Application Data

[63] Continuation of Ser. No. 500,483, Jun. 2, 1983, abandoned.

[30] Foreign Application Priority Data

Oct. 11, 1982 [DE] Fed. Rep. of Germany ....... 3237633

[51] Int. Cl.$^4$ ..................... B32B 03/10; B32B 31/20; B29C 43/20
[52] U.S. Cl. ................................... 156/222; 156/242; 156/252; 156/256; 156/309.6; 264/156; 264/273; 428/139; 428/922
[58] Field of Search ............ 156/222, 242, 252, 309.6, 156/256; 361/220, 216; 264/154, 156, 261, 271.1, 273, 246, 245; 428/137, 138, 131, 132, 133, 139, 161, 922, 924; 427/289, 122, 123, 58, 290, 372.2

[56] References Cited

U.S. PATENT DOCUMENTS

| | | | |
|---|---|---|---|
| 1,206,346 | 11/1916 | McTernen | 428/139 X |
| 1,861,663 | 6/1932 | Lahey | 428/137 |
| 2,071,921 | 2/1937 | Dickson | 156/252 X |
| 2,244,557 | 6/1941 | Iknayan | 264/273 X |
| 3,040,210 | 6/1962 | Charlton et al. | 156/242 X |
| 3,118,789 | 1/1964 | Wiswell et al. | 427/290 X |
| 4,101,689 | 7/1978 | Wienand et al. | 156/252 X |

FOREIGN PATENT DOCUMENTS

| | | | |
|---|---|---|---|
| 2824739 | 2/1979 | Fed. Rep. of Germany | 428/922 |
| 53-46369 | 4/1978 | Japan | 264/273 |
| 0305694 | 2/1929 | United Kingdom | . |
| 0635091 | 4/1950 | United Kingdom | . |
| 1034597 | 6/1966 | United Kingdom | 361/216 |

*Primary Examiner*—Donald E. Czaja
*Assistant Examiner*—Ramon R. Hoch
*Attorney, Agent, or Firm*—Felfe & Lynch

[57] ABSTRACT

A method of making an electrically-conductive floor covering presses a polymeric bottom layer into apertures in a top layer having a higher flow viscosity than the bottom layer, the pressure also bonding the layers together. The bottom layer contains from about 3% to about 80% by weight carbon black or graphite for electrical conduction; the top layer contains not more than about 0.5% thereof. The apertures in the top layer are at least 1 mm in diameter and regularly or irregularly spaced from the next adjacent aperture from about 2 mm to about 40 mm, the area of the apertures not exceeding 40% per unit area of the top layer. The dark color of the bottom layer resulting from its carbon black or graphite content therefore need not significantly affect the appearance of the top layer, but provides electrical conductivity through the apertures.

21 Claims, No Drawings

METHOD OF MANUFACTURING LIGHT-COLORED ELECTRICALLY-CONDUCTIVE FLOOR COVERING

This application is a continuation of application Ser. No. 500,483, filed June 2, 1983, now abandoned.

The invention relates to a method of manufacturing a light-colored, resilient, electrically-conductive floor covering, especially for operating rooms and premises with explosion hazards, wherein a bottom layer made of unvulcanized rubber and containing from 3 to 80 weight percent carbon black and/or graphite is joined under pressure to and vulcanized with a bondable top layer containing not more than 0.5 weight percent carbon black and/or graphite.

A method of this type is known from U.S. Pat. No. 3,040,210. There the layers which are pressed together are made of unvulcanized rubber. While being pressed together, they become firmly bonded to each other, and the bond so formed will be stable after the vulcanization which follows.

The upper of the two layers has an electrically-nonconductive composition with embedded electrically-conductive particles whose composition is otherwise the same. The particles make contact with one another and with the electrically-conductive lower layer through which electrical charges reaching the surface of the finished floor covering are dissipated.

The minimum conductivity required for use in premises with an explosion hazard or in operating rooms, for example, can be provided with such a manufacturing method only when a large proportion of the upper of the two layers consists of electrically-conductive particles, since the latter are enveloped to a large extent by nonconductive material components during the manufacturing process, which includes plastic deformation, and thus are electrically neutralized.

The electrical conductivity of a rubber mixture can be economically controlled only by admixing carbon black or graphite, in other words, additives which will also color the material black. This imposes narrow limits on an increase in the number of electrically-conductive particles in the upper layer. While the conductivity can also be increased by the addition of metal powders, their content will have to be so high that the resilience of the floor covering will be markedly reduced and resemble that of ceramic floor coverings. Such hardness is undesirable for orthopedic reasons.

In the vulcanization of rubber, there further occurs, immediately before crosslinking sets in, a liquefaction of the composition used, and this liquefaction is conducive to the reciprocal mixing of differently colored constituents which are adjacent to one another. The contours of the electrically-conductive granules embedded in the upper layer thus undergo an unattractive softening, and there are other shifts which are undesirable from an esthetic point of view.

The object of the invention is to improve a method of the type outlined at the outset in such a way that the drawbacks mentioned are avoided. The method, while economical, should in particular permit a light or other colored floor covering with a specific minimum electrical conductivity to be produced from a polymeric material which has a distinctly textured surface pattern in which zones of black coloration will not detract from the appearance. It should be possible to vary the relief-like texture and the color pattern of the surface independently of each other and over a wide range. Moreover, the proposed method should permit a press or vulcanization skin to be produced on the surface which, in the form of a continuous layer, seals off the areas consisting of differently-colored polymeric materials regardless of their particular color pattern.

In accordance with the invention, this object is accomplished.

A top layer is produced from any desired material which, under the conditions of being superposed and pressed together with a bottom layer, exhibits a higher flow viscosity than the latter and which, by its nature, is capable of forming a firm bond with the material of the bottom layer. For example, the top layer may be made of wood, an fabric, an uncrosslinked rubber, or plastic. All that need to be done when thermal softening occurs under the conditions of pressing is to make certain that the flow viscosity is greater than that of the simultaneously-softening material of the bottom layer. In this way, good definition of the contours between the differently colored areas is obtained. The flow viscosity here involved is referred to as Mooney viscosity in the case of rubber-elastic materials.

Proper coordination of the flow viscosities can be achieved by selection of appropriately different materials for the bottom and top layers. For example, the bottom layer may be made of a rubber-elastic material and the top layer of a thermoplastic material. Particularly well suited are polyester and polyamide, which may be used both in sheet form and as woven or knitted fabrics or as nonwovens. All that need to be done in a given case is to ascertain whether sufficiently stable adhesion can be secured. If desired, the latter can be improved by interposing a layer of an adhesion promoter, for example, a polyurethane adhesive, a polychloroprene adhesive, a resorcinol-formaldehyde latex or a chlorinated-rubber solution. In the case of open-meshed layers, such as a fabric or a nonwoven, such a layer will at the same time prevent the rubber-elastic material, which softens during vulcanization, from penetrating into the pores of the top layer.

When the bottom and top layers are to be made from materials of a similar nature, for example, a rubber-elastic material, an increase in the flow viscosity of the top layer under the conditions of pressing may be obtained by admixing with it a relatively high proportion of a mineral filler. Similarly, the flow viscosity of the bottom layer can be reduced by the use of or by admixing a copolymeric material having a particularly low viscosity, or by the use of a special vulcanizing agent of a different nature. It is also possible to produce the top and bottom layers from identical rubber-elastic materials if the top layer is prevulcanized and thus prevented from synchronous softening while it is being united with the bottom layer under pressure.

The top layer, adapted to the material of the bottom layer in the manner described, is provided with regularly and/or irregularly distributed perforations with a diameter of not less than 1 mm which are distributed so that the minimum spacing between two perforations is not under 2 mm and not over 40 mm, a condition being that the total coverage of the surface not exceed 40 percent, and preferably 20 percent.

The apertures in the top layer in the form of perforations may be produced by any desired technique, for example, by punching, cutting or drilling. With a view to achieving good definition of the contours of the colored pattern, great care must be taken to remove burrs and other loose material which is produced in such machining. In addition, it is advisable to place the top layer on the bottom layer in such a way that the side which had the burrs faces the bottom layer. Residual burrs which have been overlooked then are farther removed from the actual wearing surface and thus are not directly visible in the finished floor covering.

The boundary surfaces of the apertures are perpendicular to the covering surfaces of the top layer to prevent a change in overall impression of the color pattern after wear has set in. The outline as such can be selected at will and may be of any desired configuration so long as it does not detract from the intrinsic strength of the top layer. However, in addition to circular and polygonal outlines, pictograms, which may be of an advertising or indicational nature, are preferably used. By their use, the various departments of a department store, for example, or paths and traffic areas can be identified in a durable and easily understandable manner.

The apertures are associated with one another in mosaic fashion and, taken together, may depict pictograms, letters, numbers, continuous lines and/or graphic representations serving to inform and to enlighten. The individual aperture is of small size, preferably between 1 and 5 mm, and is associated with the adjacent apertures at a comparably close spacing. As a rule, resolution of the pattern so formed thus is not possible from a normal viewing distance and with the naked eye, which esthetically is of great ad- vantage.

The higher the degree to which it is uncovered, based on the total area, the more the color of the black bottom layer which is visible in the apertures will predominate. However, even a coverage of 0.05 percent is sufficient to meet the requirements of DIN 51953 concerning the dissipation of electrostatic charges in premises with an explosion hazard. The proportion of the surface of a lightcolored floor covering represented by surface areas which are black then is so small that the overall impression of the color comes very close to that of the light ground color. The latter is further emphasized, with respect to its shade, by razor-sharp demarcation from the areas defined in black, which are preferably associated with one another in the manner of a continuous pattern.

With a view to creating artistic highlights, it will be advantageous in pictorial representations to space the apertures uniformly and to give them a gradually and/or abruptly varying size, or, if of uniform size, to vary their spacing gradually and/or abruptly. This purpose will also be served by an abrupt and/or gradual variation of the configuration of the basic area of each aperture, for example, imperceptible transition from a square to a rectangular basic form. As a result, the basically two-colored surface will be enhanced by light and shadow effects.

Because of the small size of the individual apertures, the top layer possesses good intrinsic stability. Even with large-size displays, it is therefore unlikely that the top layer will be distorted or damaged during its handling in the course of the pressing operation. The design chosen in a given case may therefore cover practically any desired portion of the surface of the floor covering and may be varied in practically any desired manner.

The bottom layer consists of a polymeric material which is plastically deformable under the conditions of pressing, for example, uncrosslinked rubber or plastic, and is composed and dimensioned in such a way that after pressing the electrical resistance of an area of 20 cm$^2$ is not more than 10$^4$ ohms in the vertical direction. The thickness of the bottom layer should be at least equal to that of the top layer, the electrical conductivity being based on a carbon black and/or graphite content of from about 3 to about 80 and preferably not less than 10 weight percent. Greater thickness will result in a general stiffening of the floor covering obtained, which will facilitate installation.

The top and bottom layers are placed one on top of the other and pressed together in a forming die so that the bottom layer completely fills the apertures in the top layer. The temperature is controlled in such a way that the desired reciprocal bonding and compacting of the materials of the two layers is secured. This means that when thermoplastically deformable materials are used to produce the two layers, an initial heating phase may be followed by a cooling phase, whereas when vulcanizable materials are used, simple heating to vulcanizing temperature will generally suffice. The latter may vary widely, depending on the material used in a given case, and preferably ranges from 150° to 190° C. Continuous operation with a belt calender is also possible.

The platens of the forming die which are vertically pressed against each other may be of smooth and plane construction, which will result in a floor covering with top and bottom surfaces perfectly smooth and plane. Such floor coverings are distinguished by particularly high resistance to mechanical loads. By using an upper press platen having a relieflike texture, the antislip properties of the floor covering produced may be improved, which is frequently desirable or necessary when it is to be placed in a wet area. The effectiveness of the keying after placement can be improved by texturing the bottom side in the same way. When the relief so formed consists of a plurality of closely spaced columns, an improvement in underfoot resilience and footfall sound absorption is further obtained if a bottom layer made of a rubber-elastic material is used. The example which follows will serve to illustrate the invention.

EXAMPLE 1

A rubber mixture consisting of formulation A is homogenized in a internal mixer. The mixture is then fed to a calender and calendered into a sheet having a thickness of between 0.5 and 1 mm. The sheet is wound into a coil and then transferred to a belt calender where it is prevulcanized at a surface temperature of 180° C. and a running speed of 80 meters/hour, which corresponds to a residence time of about 3 minutes.

The components of formulation I are introduced into the interal mixer and after complete homogenization of the mixture calendered into a sheet of a thickness between 1.5 and 2 mm.

The sheet of composition A is provided in a roller punching tool with apertures which penetrate it completely. These are cylindrically bounded, have a diameter of 1.8 mm, and are uniformly spaced 20 mm apart in the longitudinal and transverse directions. The apertures as a whole form a mosaic resembling a tile pattern. The sheet forms the top layer, for the purposes of the proposed method. Its intrinsic strength is such that it can be handled without any danger of the pattern formed by the apertures being damaged or distorted.

The two sheets are then placed one on top of the other and transferred to a heated calender. The sheet provided with the perforations faces a polished calender roll. The latter has a surface temperature of 180° C. and a running speed of 36 meters/hour, which corresponds to a residence time of the composite of 6 minutes. During that time, the layers are vulcanized and undetachably bonded to one another. The surface is distinguished by a continuous vulcanization skin which is broken up only with respect to its color by the material of the bottom layer which has been forced into the apertures. A comparable result can be obtained when in place of a polished calender roll a calender roll with a wafflelike texture, or a corresponding press die, is used.

|  | Percent | |
| --- | --- | --- |
|  | A | 1 |
| SB rubber | 15 | 11.8 |
| High-styrene resin (65% block styrene) | 2.4 | 5.6 |
| Kaolin | 60 |  |
| Carbon black N770 |  | 61.5 |
| Chalk | 8.5 | 14.9 |
| Plasticizer | 1.7 | 3.35 |
| TiO₂ | 2.5 |  |
| Lithopone | 6.7 |  |
| ZnO | 0.7 | 0.7 |
| Stearic acid | 0.35 | 0.35 |
| Triethanolamine | 0.35 |  |
| Paraffin | 0.35 | 0.35 |
| Anti-ageing agent | 0.2 | 0.2 |
| 2-Mercaptobenzothiazole | 0.2 | 0.2 |
| Dibenzothiazyl disulfide | 0.2 | 0.2 |
| Sulfur | 0.85 | 0.85 |
|  | 100 | 100 |

Figures are percent, based on total weight of mixture.

EXAMPLE 2

A comparison sample of the sheet made from mixture I is perforated as described in Example 1 and laid on the top surface of the prevulcanized sheet made from mixture A. The rest of the procedure is as described in Example 1. Because of the differences in the viscosity at 170° C., no clean surfaces are obtained, that is to say, mixture A, which has poorer flow properties, does not fill the apertures punched in the top layer, and the contours of the apertures are not sharply defined.

EXAMPLE 3

In a sample according to Example 1, the top layer is replaced with an appropriately perforated woven fabric made from polyester fibers. The fabric, of a thickness of 2.4 mm, has a weight of 350 g/m² and is provided on its back with a layer of a resorcinol-formaldehyde latex for the purpose of closing the pores and assuring good adhesion to the rubber-elastic material of the middle layer. The other layers, their arrangement relative to each other, and the conditions under which they are all pressed together are as described in Example 1. Because of its fabric surface areas, the floor covering so obtained is distinguished by an attractive appearance and good thermal insulation and foot-fall absorption. It stands up well under shopping-cart traffic and easily withstands high static and dynamic loads.

It will be understood that the specification and examples are illustrative but limitative of the present invention and that other embodiments within the spirit and scope of the invention will suggest themselves to those skilled in the art.

What is claimed is:

1. A method or process of making an electrically-conducting floor covering, comprising: providing in superposed sheet form both a top layer having apertures and a bottom layer; and only filling the apertures of the top layer only by pressing at a temperature allowing the bottom layer into the apertures of the top layer and, with the pressure, simultaneously bonding the bottom layer to the top layer, the bottom layer being a rubber material containing from about 3% to about 80% by weight of at least one of carbon black and graphite and having a flow viscosity sufficiently lower than that of the top layer to be effective for so only filling the apertures of the top layer only by pressing with the apertures of the top layer being sharply defined and without distortion, and the top layer being a material containing not more than about 0.5% by weight of carbon black and graphite, each aperture therein having a diameter of not less than about 1 mm and being spaced from the next adjacent apertures from about 2 mm to about 40 mm, the area of the apertures not exceeding about 40% per unit area of the top layer.

2. The method of claim 1, wherein forming the top layer comprises forming the same with apertures of from 1 mm--and--5 mm diameter.

3. The method of claim 1, wherein forming the top layer comprises forming the same with the area of the apertures therein not exceeding 20% per unit area of the top layer.

4. The method of claim 1, wherein forming the top layer comprises forming the same with each aperture therein configured the same.

5. The method of claim 4, wherein forming the top layer comprises forming the same with the apertures configured as indica.

6. The method of claim 1, wherein forming the top layer comprises forming the same with at least some of the apertures irregularly distributed for mosaically forming indica.

7. The method of claim 4, wherein forming the top layer comprises forming the same with at least some of the apertures irregularly distributed for mosaically forming indica.

8. The method of claim 6, wherein forming the top layer comprises forming the same with differently shaped apertures.

9. The method of claim 1, wherein forming the top layer comprises forming the same with at least some of the apertures therein configured as indica.

10. The method of claim 1, wherein forming the bottom layer comprises forming the same with not less than 10% by weight of at least one of carbon black and graphite.

11. The method of claim 1 wherein providing the top and bottom layers further comprises providing the top layer as a rubber and prevulcanizing only the top layer prior to the pressing thereof with the bottom layer for achieving the relative flow viscosities of the layers.

12. The method or process of claim 1, and further comprising laying the bottom layer on a floor.

13. The method of process of claim 2, and further comprising laying the bottom layer on a floor.

14. The method of process of claim 3, and further comprising laying the bottom layer on a floor.

15. The method of process of claim 4, and further comprising laying the bottom layer on a floor.

16. The method of process of claim 5, and further comprising laying the bottom layer on a floor.

17. The method of process of claim 6, and further comprising laying the bottom layer on a floor.

18. The method of process of claim 7, and further comprising laying the bottom layer on a floor.

19. The method of process of claim 8, and further comprising laying the bottom layer on a floor.

20. The method of process of claim 9, and further comprising laying the bottom layer on a floor.

21. The method of process of claim 10, and further comprising laying the bottom layer on a floor.

* * * * *